(12) United States Patent
Lin et al.

(10) Patent No.: US 8,309,185 B2
(45) Date of Patent: Nov. 13, 2012

(54) NANOPARTICLE FILM AND FORMING METHOD AND APPLICATION THEREOF

(75) Inventors: Meng-Hsien Lin, Hsinchu (TW);
Hung-Ying Chen, Yunlin (TW);
Shang-Jr Gwo, Hsin-Chu (TW)

(73) Assignee: National Tsing Hua University, Hsinchu (TW)

( * ) Notice: Subject to any disclaimer, the term of this patent is extended or adjusted under 35 U.S.C. 154(b) by 367 days.

(21) Appl. No.: 12/773,565

(22) Filed: May 4, 2010

(65) Prior Publication Data
US 2011/0274913 A1    Nov. 10, 2011

(51) Int. Cl.
*H05H 1/24* (2006.01)
*B05D 3/00* (2006.01)
*B05D 1/38* (2006.01)
*B05D 1/18* (2006.01)

(52) U.S. Cl. ...... 427/569; 427/201; 427/202; 427/430.1

(58) Field of Classification Search .............. 427/430.1, 427/402, 331, 202, 569
See application file for complete search history.

(56) References Cited

U.S. PATENT DOCUMENTS

| | | | | |
|---|---|---|---|---|
| 6,805,904 | B2 * | 10/2004 | Anders et al. | 427/203 |
| 7,396,569 | B2 * | 7/2008 | Lalli et al. | 427/409 |
| 2004/0005723 | A1 * | 1/2004 | Empedocles et al. | 438/1 |
| 2006/0225162 | A1 * | 10/2006 | Yi | 977/754 |
| 2008/0182013 | A1 * | 7/2008 | Reeves et al. | 427/118 |
| 2010/0102026 | A1 * | 4/2010 | Lee et al. | 216/13 |

* cited by examiner

*Primary Examiner* — David Turocy
(74) *Attorney, Agent, or Firm* — Stout, Uxa, Buyan & Mullins, LLP (57) ABSTRACT

One embodiment of the present invention provides a method for forming a nanoparticle film, which comprises the steps of: preparing a nanoparticle solution, which comprises a solvent and supersaturated nanoparticles with surface ligand molecules; and dip coating a substrate to the nanoparticle solutions to form a first monolayer of the nanoparticles on the substrate, the first monolayer and repeatedly formed monolayers on top of the first monolayer constructing the nanoparticle film. Another embodiment of the present invention provides a nanoparticle film, comprising a first monolayer consisted of a two-dimensional nanoparticles array that are near-field coupled with each other to have tunable plasmonic properties by changing the number of stacked monolayers.

15 Claims, 14 Drawing Sheets

NANOPARTICLE FILM AND FORMING METHOD AND APPLICATION THEREOF

BACKGROUND OF THE INVENTION

1. Field of the Invention

The present invention relates to nanoparticle films and their forming methods and applications.

2. Description of Related Art

Nanotechnology has been developed as a reliable technology for producing minimal components to perform more precise functions. In nanotechnology, nanoparticles are fundamental as building blocks to form novel materials because they have several unique features. For example, the properties of nanoparticles are determined by quantum rather than classical physics due to their small size; the surface physics of material may determine the properties of the material due to the large surface-atoms to bulk-atoms ratio; and the surface properties of the materials may be modified through self-assembled monolayer coatings.

A large variety of shape-controlled nanoparticles, including metal, semiconductor, organic, magnetic, insulating, superconductor, and so on, have been chemically synthesized in the literature; and generally they are formed or assembled on a substrate to practice its unique properties; in other words, a nanoparticle film may be defined as a film containing one, two, or three-dimensional bulk assemblies of nanoparticles.

The one, two, or three-dimensional nanoparticle assemblies of the nanoparticle films typically exhibit properties that are not present in the bulk material and that can be applied in various fields. For example, surface plasmons are coherent electron oscillations that exist at the interface between any two materials, such as a metal material and a dielectric, when the metal material is nanometer-sized, light excites the surface plasmons at the interface between the metal material and the dielectric, resulting in plasmon resonance. In the past few years, the optical measurements of various types of plasmon resonances, such as surface plasmon resonance (SPR), localized plasmon resonance (LPR), and collective plasmon resonance (CPR), have been utilized for sensing applications in chemistry and biology to detect moleculars, such as polymers, DNA, or proteins' adsorption.

Recently, considerable attention has been directed to the studies of near-field-coupled noble metal nanoparticle systems because of their tunable plasmonic properties, which are very desirable for a variety of applications. Among these systems, the coupling effects of plasmonic dimers constructed by two nanoparticles placed next to each other within the near-field range have been widely studied. For more complex systems, it has become clear that collective plasmon resonance (CPR) in coupled colloidal gold nanoparticles arrays can manifest itself as plasmonic crystal effects. In a recent work, it has been shown that the CPR modes can be generated in two-dimensional (2D) self-assembled gold nanoparticles superlattices via near-field coupling between neighboring nanoparticles in close-packed superlattices. It has also been confirmed that the CPR peak position can be sensitively tuned by varying the interparticle gap distance. Moreover, Tao et al. has demonstrated that silver nanoparticles can be used as building blocks to construct 3D plasmonic crystals. (Prodan, E., Radloff, C., Halas, N.J. & Nordlander, P. A hybridization model for the plasmon response of complex nanostructures. *Science* 302, 419-422 (2003); Su, K.-H., Wei, Q.-H., Zhang, X., Mock, J. J., Smith, D. R. & Schultz, S.; Interparticle coupling effects on plasmon resonances of nanogold particles. *Nano Lett.* 3, 1087-1090 (2003); Nordlander, P., Oubre, C., Prodan, E., Li, K. & Stockman, M. I. Plasmon hybridization in nanoparticle dimers. *Nano Lett.* 4, 899-903 (2004); Jain, P. K., Huang, W. & El-Sayed, M. A. On the universal scaling behavior of the distance decay of plasmon coupling in metal nanoparticle pairs: A plasmon ruler equation. *Nano Lett.* 7, 2080-2088 (2007); Yang, S.-C., Kobori, H., He, C.-L., Lin, M.-H., Chen, H.-Y., Li, C., Kanehara, M., Teranishi, T. & Gwo, S. Plasmon hybridization in individual gold nanocrystal dimers: Direct observation of bright and dark modes. *Nano Lett.*, vol. 10, 632-637 (2010); Tao, A., Sinsermsuksakul, P. & Yang, P. Tunable plasmonic lattices of silver nanocrystals. *Nature Nanotechnol.* 2, 435-440 (2007); Chen, C. F., Tzeng, S. D., Chen, H.-Y., Lin, K.-J. & Gwo, S. Tunable plasmonic response from alkanethiolate-stabilized gold nanoparticle superlattices: Evidence of near-field coupling. *J. Am. Chem. Soc.* 130, 824-826 (2008); Tao, A. R., Ceperley, D. P., Sinsermsuksakul, P., Neureuther, A. R. & Yang, P. Self-organized silver nanoparticles for three-dimensional plasmonic crystals. *Nano Lett.* 8, 4033-4038 (2008)).

Several methods, such as drying of colloidal gold solution droplets deposited onto substrates, electrophoretic deposition, cross-linking nanoparticles with linkers, have been reported in the literature for forming nanoparticle films. For example, successful multilayered gold films made on glass supports by a layer-by-layer deposition have been reported in the literature. The conventional layer-by-layer electrostatic self-assembly is a simple yet elegant way to deposit macroscopic, multilayered nanoparticle films onto surfaces functionalized by oppositely charged (e.g., polyelectrolytes) or chemically conjugated (e.g., dithiols) cross-linkers. However, the use of cross-linkers drastically reduces the mobility of the individual nanoparticles and hinders the formation of well-ordered superlattices. Therefore, both close packing and long-range ordering are not feasible using these approaches, as evidenced in the related microscopic studies. Moreover, interlayer plasmonic coupling, which is important for the realization of 3D plasmonic metamaterials, is generally nonexistent in these multilayer systems. In addition, the conventional layer-by-layer method suffers from a number of disadvantages: its procedure is too slow, other problems: amorphous structures, limited film thickness, nonuniformity.

In addition, important questions remain about the practicality of self-assembly techniques for fabricating nanoparticle films. For example, it is important to demonstrate the feasibility to deposit a single layer of highly ordered nanoparticles over a wafer-scale substrate. Until now, the largest 3D nanoparticle crystals grown by self-assembly techniques have been limited to sub-millimeter dimensions. Furthermore, it would be more controllable to deposit nanoparticle films in a novel layer-by-layer fashion, similar to the molecular-beam epitaxy technique used for fabricating semiconductor devices. If these capabilities can be realized, it would become more practical to build 3D nanoparticle films with engineerable properties, such as the plasmon resonance. Hence, one of the outstanding challenges in the art of nanotechnology is to form large-scale self-assembly of nanoparticle films which exhibit controllable collective properties. In particular, the large-scale, self-assemble, three-dimensional (3D) nanoparticle films should have strong and tunable properties, such as plasmonic response, which could allow the creation of novel materials for a variety of applications. Therefore, it would be advantageous to provide novel nanoparticle films and their forming methods and applications capable of achieving such needs.

SUMMARY OF THE INVENTION

An object of the present invention is to provide large-scale self-assembly of nanoparticle films exhibiting controllable collective properties that can be employed in various applications. Particularly, the nanoparticle films have nanoparticles that are near-field coupled with each other between both of the intralayer and interlayer nanoparticles.

According to the object, one embodiment of the present invention provides a method for forming a nanoparticle film, comprising the steps of: preparing a nanoparticle solution, which comprises a solvent and supersaturated nanoparticles with surface ligand molecules; and dip coating the nanoparticle solution to a substrate to form a first monolayer of the nanoparticles on the substrate, the first monolayer constructing the nanoparticle film.

According to the object, one embodiment of the present invention provides a nanoparticle film, comprising a first monolayer consisted of a two-dimensional nanoparticles array that are near-field coupled one another.

DESCRIPTION OF THE PREFERRED EMBODIMENT

Reference will now be made in detail to specific embodiments of the invention. Examples of these embodiments are illustrated in accompanying drawings. While the invention will be described in conjunction with these specific embodiments, it will be understood that it is not intended to limit the invention to these embodiments. On the contrary, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations and components are not been described in detail in order not to unnecessarily obscure the present invention. While drawings are illustrated in details, it is appreciated that the quantity of the disclosed components may be greater or less than that disclosed, except expressly restricting the amount of the components. Wherever possible, the same or similar reference numbers are used in drawings and the description to refer to the same or like parts.

The present invention provides simple and efficient bottom-to-up assembly methods to deposit a close-packed, two or three-dimensional (multilayered) nanoparticle film over a large-area solid substrate. The nanoparticle films developed by the methods of the present invention may be advantageously utilized for analytical techniques, optoelectronic devices, electronic devices, and the likes.

Figure 1:
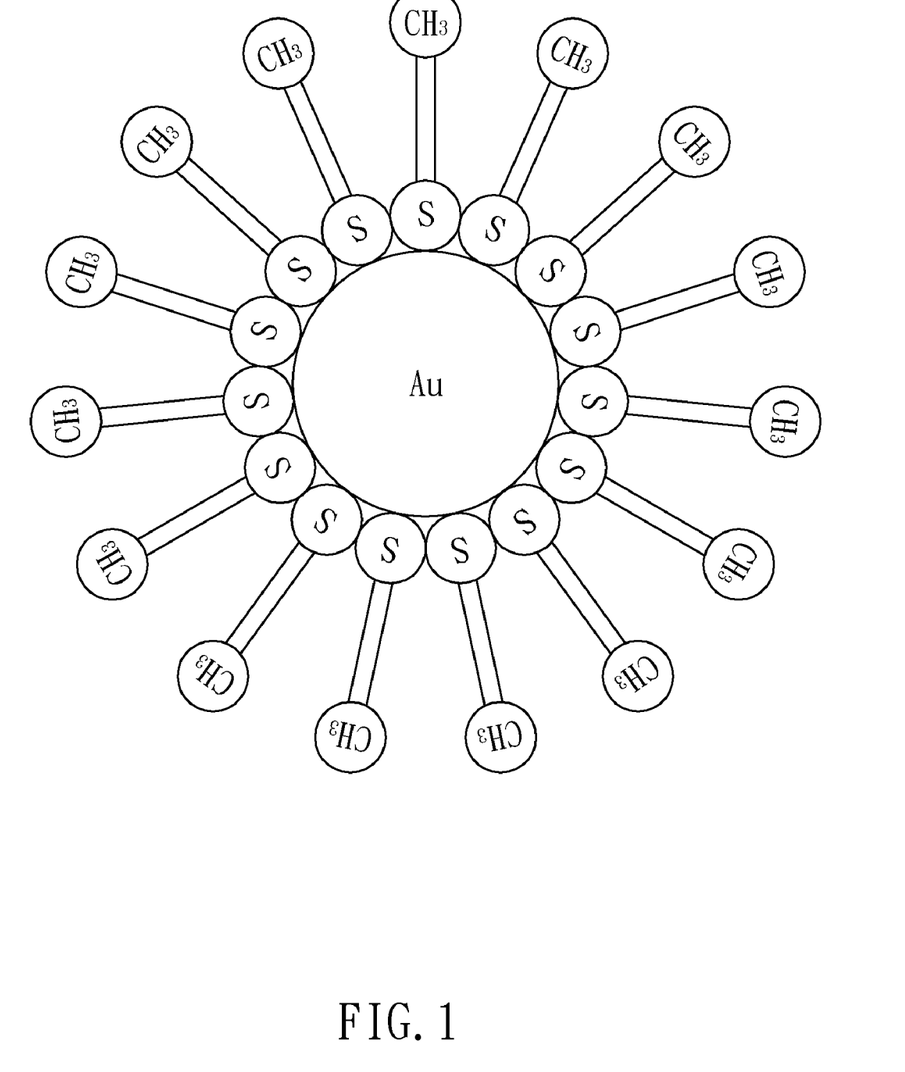
FIG. 1 shows a gold nanoparticle with alkanethiols as the surface ligand molecules according to an embodiment of the present invention.

An example of the present invention is described herein. First, gold nanoparticles are formed in about 100 ml of water by a standard method (Slot, J. W. & Geuze, H. J. A new method of preparing gold probes for multiple-labeling cytochemistry. *Eur. J. of Cell Biol.*, 38, 87-93, (1985)). Second, a 10 ml solution of 100 mM of 1-octadecanethiolate ($CH_3(CH_2)_{17}SH$) dissolved in toluene and a 10 ml solution of 100 mM of TOAB (Tetraoctylammonium bromide, [$CH_3(CH_2)_7]_4N(Br)$) dissolved in toluene are added to 80 ml of toluene. Third, the water solution containing gold nanoparticles and the toluene solution are mixed and stirred then placed in a hot plate with a temperature controlled at about 150° C. The two phase mixture is continuously heated until the gold nanoparticles are moved to the toluene from the water. Fourth, the toluene solution containing nanoparticles is then separated from the mixture, and a nanoparticle solution includes nanoparticles with ligand molecules and solvent toluene is prepared. FIG. 1 shows a gold nanoparticle with surface ligand molecules of 1-octadecanethiolate ($CH_3(CH_2)_{17}SH$), according to the embodiment of the present invention.

After purification, a controlled amount of surfactants, such as a 10 µl solution of 10 mM of TOAB dissolved in toluene, may be added into the nanoparticle solution, to from a phase segregated nanoparticle "liquid" floating on top of the toluene solution. Preferably, the gold nanoparticles are metastable and supersaturated in the nanoparticle solution.

Note that in another embodiment of the present invention, the nanoparticles, such as gold nanoparticles, may be directly prepared in a single-phase solvent, such as toluene. In this case surfactants are not needed but nanoparticles are also kept supersaturated in the solvent.

Figure 2A:
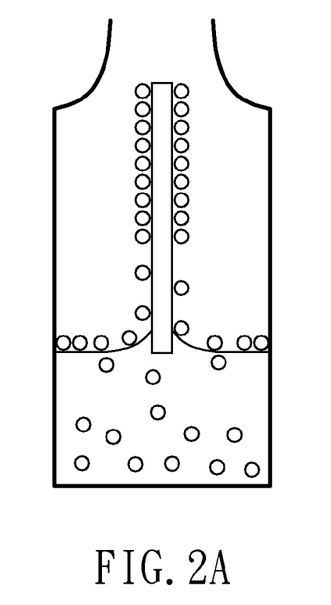
FIG. 2A shows a monolayer of nanoparticle is formed on a substrate by dip coating according to an embodiment of the present invention.

FIG. 2A shows that the metastable, supersaturated gold nanoparticle solution is then employed to form a monolayer of gold nanoparticles on a substrate by a dip coating method according to the embodiment of the present invention. As shown in FIG. 2A, nanoparticles monolayer is transferred to a chosen substrate, for example, quartz, indium tin oxide (ITO), silicon, polymer, gold, and the likes, consecutively by dipping the substrate and pulling it out perpendicular to the liquid surface. During the dip coating, the nanoparticle solution may be controlled at room temperature or an elevated temperature, such as 70° C. The elevated temperature may increase the capillarity of the nanoparticle solution.

Figure 2B:
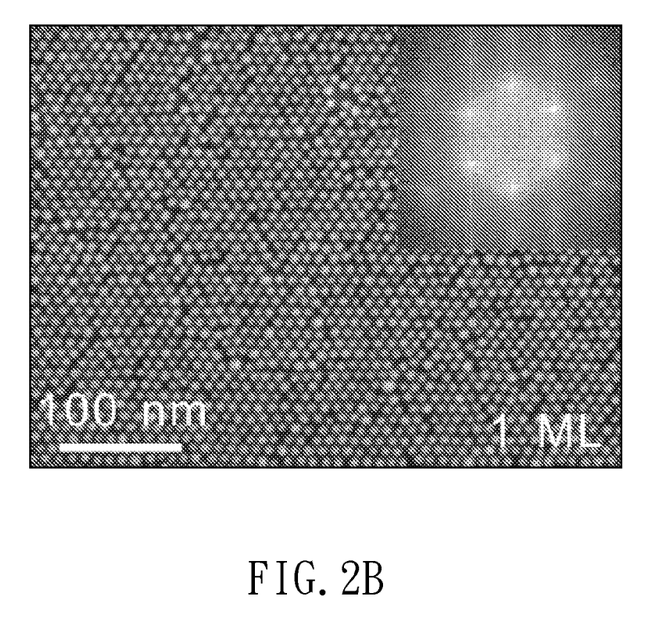
FIG. 2B shows a SEM of the monolayer shown in FIG. 2A.

FIG. 2B shows a field-emission scanning electron microscopy (FE-SEM) micrograph of a nanoparticle film comprising a nanoparticle monolayer produced by the embodiment described above. Fast Fouier Transform (FFT) and Statistics analyzes that the lattice constant of the nanoparticle monolayer is about 9 nm, the average diameter of the nanoparticles is about 6 nm, and hence the gap between two nanoparticles is about 3 nm.

In comparison with the conventional Langmuir-Blodgett technique, one distinct advantage of the present invention is that it does not require spreading and compressing the nanoparticle monolayer on the liquid surface (due to self replenishment from the supersaturated nanoparticle solution). In addition, the assembly kinetics is very fast at high temperatures on the order of few seconds for one full monolayer (ML) coverage onto a 2×2 cm$^2$ substrate area or more.

It is important to note that, without further surface ligand modification, only one nanoparticle monolayer can be formed. The gold nanoparticle of the monolayer will be redissolved in toluene once the substrate is dipped into the colloidal toluene solution. Therefore, to stack more nanoparticle monolayers, it would require that the exposed functional group of the monolayer to be converted to a solvent-phobic group. But as-synthesized nanoparticles are typically symmetric in surface ligand structure, allowing only the single monolayer formation. Therefore, in order to construct multilayered structures, it is essential to create monolayers of Janus nanoparticles (particles displaying simultaneously two distinctly different surface properties). The plasma-based surface modification technique described in U.S. patent application Ser. No. 12/502,226, entitled "Method for Modifying Surface in Selective Areas and Method for Forming Patterns," is suitable for this purpose and adopted by the present invention, the entire content of which is incorporated herein by references.

Figure 3A:
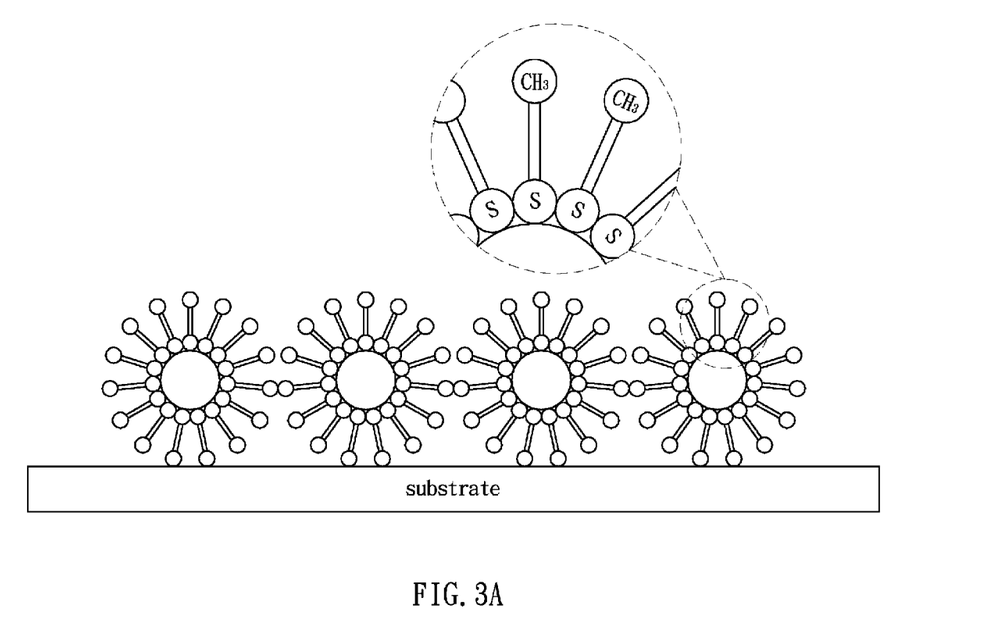
FIG. 3A to 3D shows another monolayer of nanoparticle is deposited on top of the initial monolayer shown in FIG. 2A after plasma modification according to an embodiment of the present invention.

FIG. 3A shows a nanoparticle film comprising a gold nanoparticle monolayer produced by the above embodiment. Each nanoparticle may be roughly divided into a hidden side and an exposed side, the hidden side toward to the direction of the substrate and the exposed side toward the diareaction opposite to the substrate.

Figure 3B:
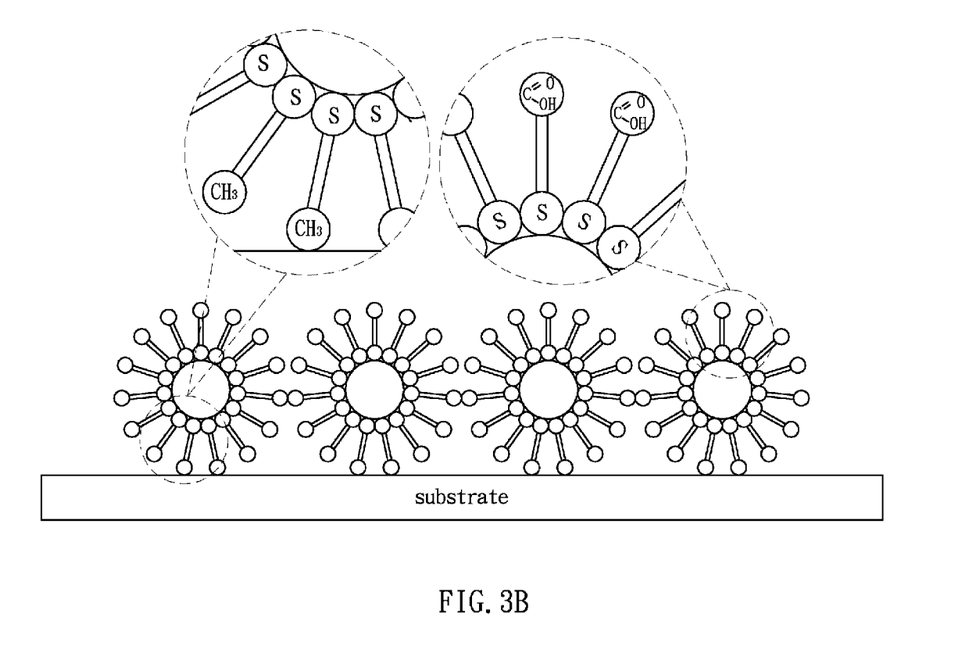
Figure 3C:
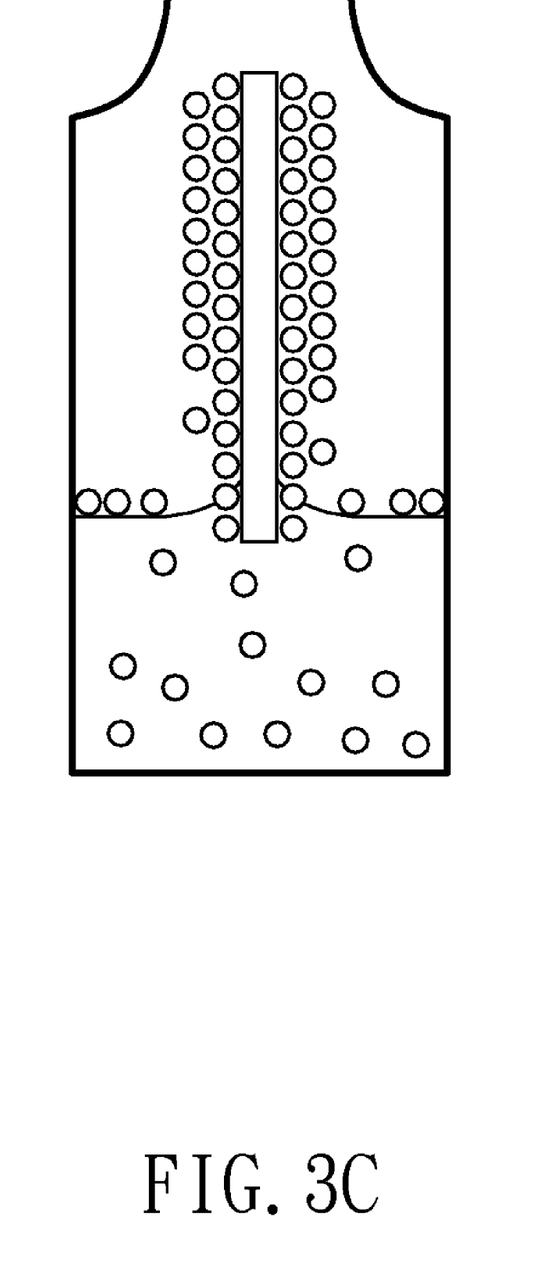
Figure 3D:
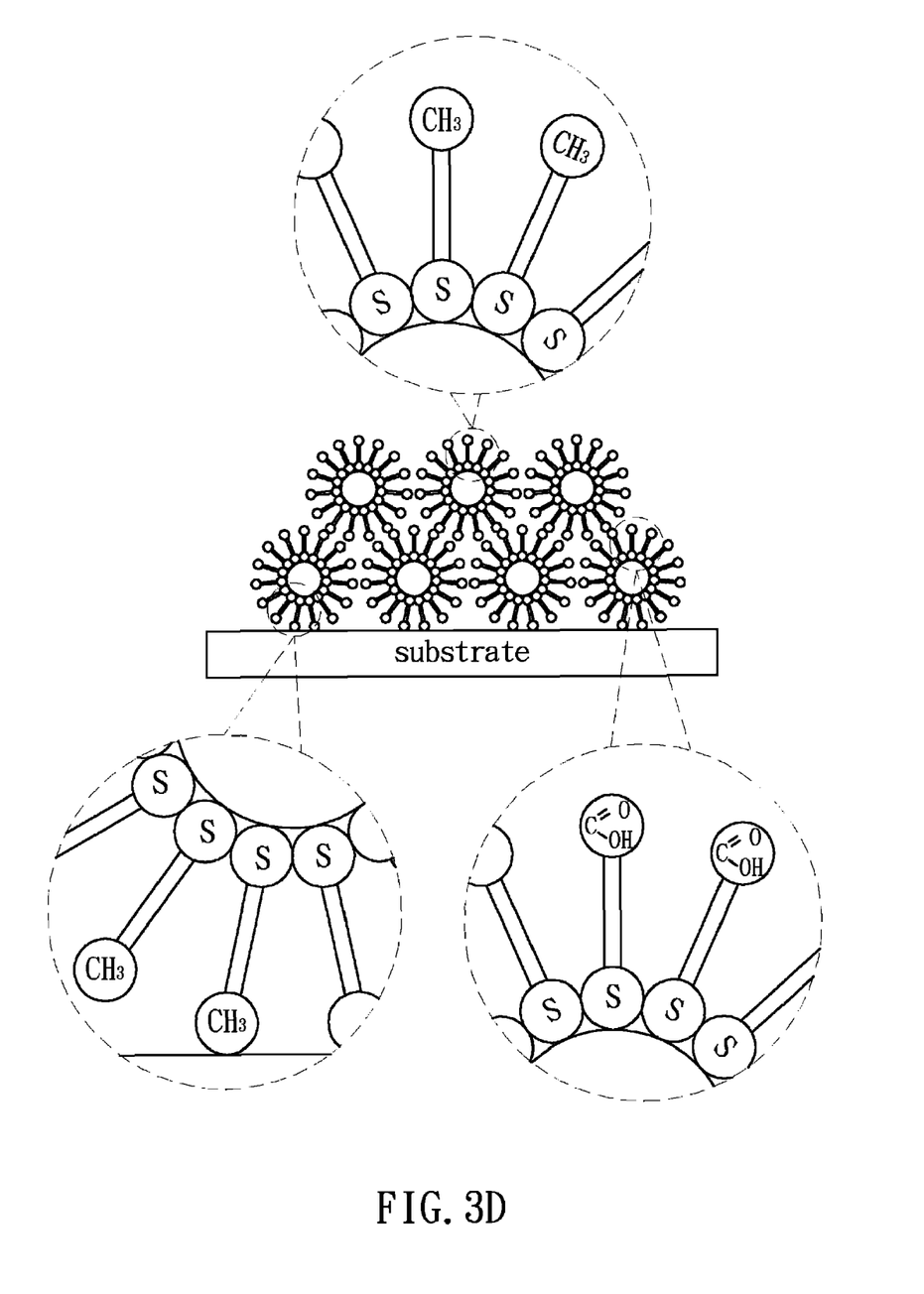

FIG. 3B shows the nanoparticle film of FIG. 3A with further surface ligand modification after plasma treatment. By using plasma modification, the exposed methyl groups of exposed side of thiolate-stabilized nanoparticles on the surface can be converted into oxidized moieties, such as carbonyl group (—COOH), which are solvent-phobic in the gold nanoparticle solution. This unique surface property makes the nanoparticle monolayer not dissolvable in the solvent toluene during subsequent dipping into the nanoparticle solution and allows for deposition of additional monolayers in an epitaxial growth manner, as shown in FIG. 3D.

Figure 3E:
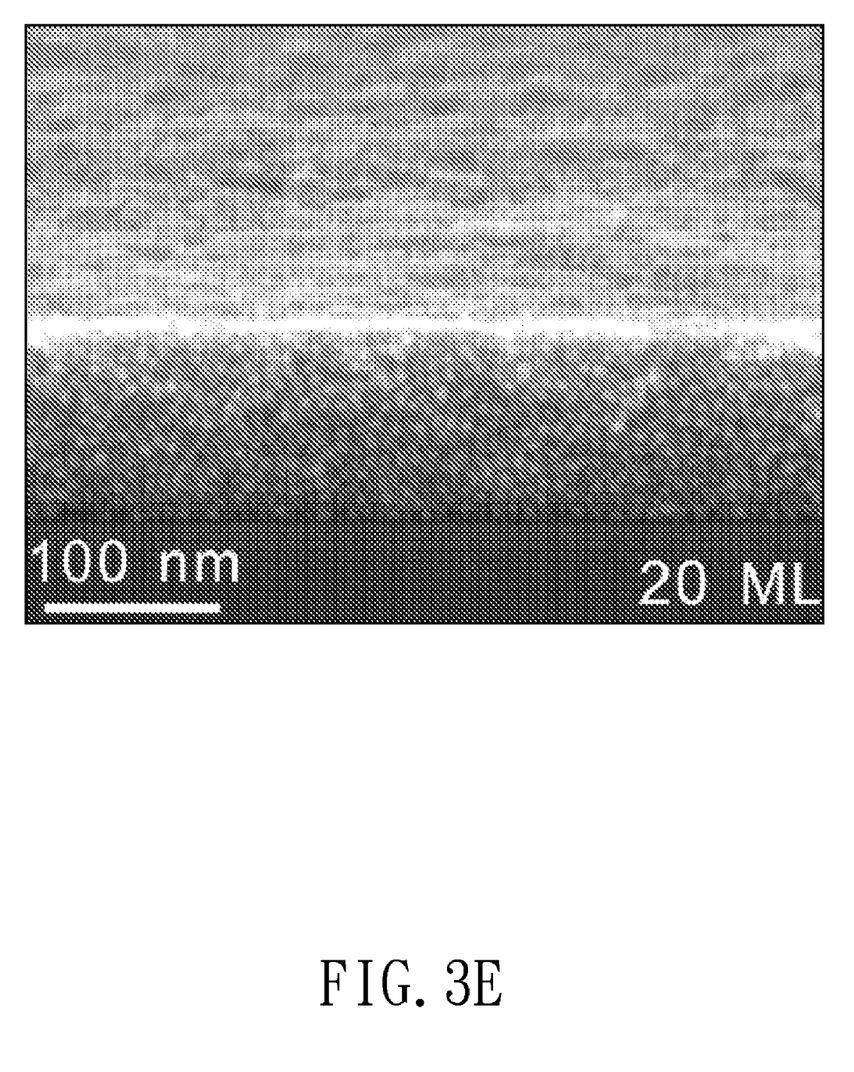
FIG. 3E shows a SEM of a nanoparticle film comprising 20 monolayers of gold nanoparticles deposited in a silicon substrate according to an embodiment of the present invention.

By repeating method mentioned above, a nanoparticle film comprising many monolayers of nanoparticle can be formed. FIG. 3E shows a field-emission scanning electron microscopy (FE-SEM) micrograph of a nanoparticle film comprising twenty nanoparticle monolayers produced by the embodiment described above.

Figure 4A:
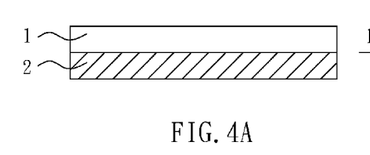
FIG. 4A to FIG. 4D shows a lithography and lifted off method to form a patterned nanoparticle structures according to an embodiment of the present invention.
Figure 4B:
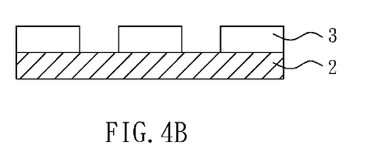
Figure 4C:
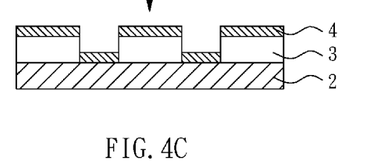
Figure 4D:
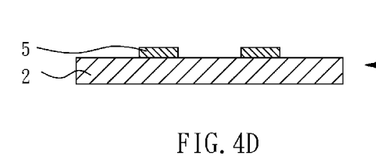

The plasma treatment may be performed through a mask so that the nanoparticle film comprising one or more monolayers of nanoparticles can be patterned for various applications. In one embodiment, the mask is made of an elastic material, such as PolyDiMethylSiloxane (PDMS). Further, FIG. 4A to FIG. 4D show a lithography and lift-off method for forming a patterned nanoparticle film according to an embodiment of the present invention. Referring to FIG. 4A, a resist layer 1 is formed on a substrate 2. Referring to FIG. 4B, the resist layer 1 is patterned to a patterned resist layer 3 by a conventional lithography process. Referring to FIG. 4C, a nanoparticle film 4 comprising one or more monolayers of nanoparticles is formed on the top surface of the patterned resist layer and the surface of substrate. Referring to FIG. 4D, the patterned resist layer 3 is lifted off from the substrate 2 by a solvent capable of stripping the resist layer, and a patterned nanoparticle film 5 is remained.

Figure 5A:
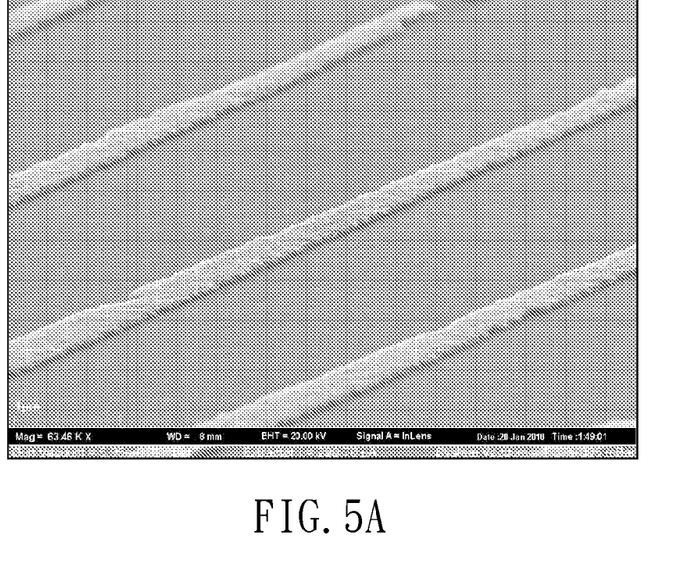
FIG. 5A to FIG. 5D are SEMs of a patterned nanoparticle film with different magnification.
Figure 5B:
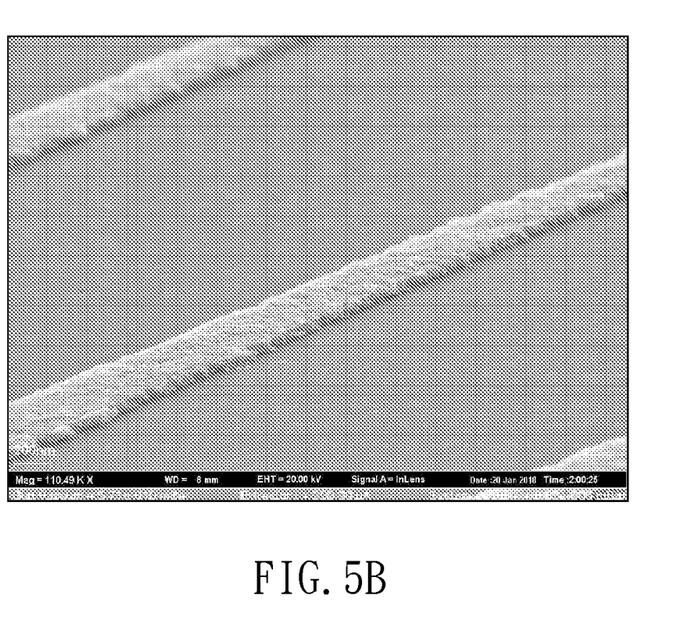
Figure 5C:
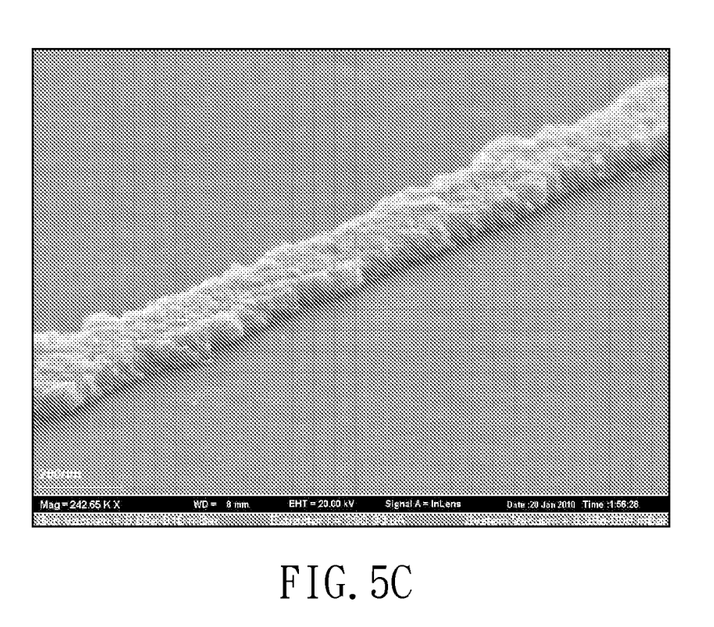
Figure 5D:
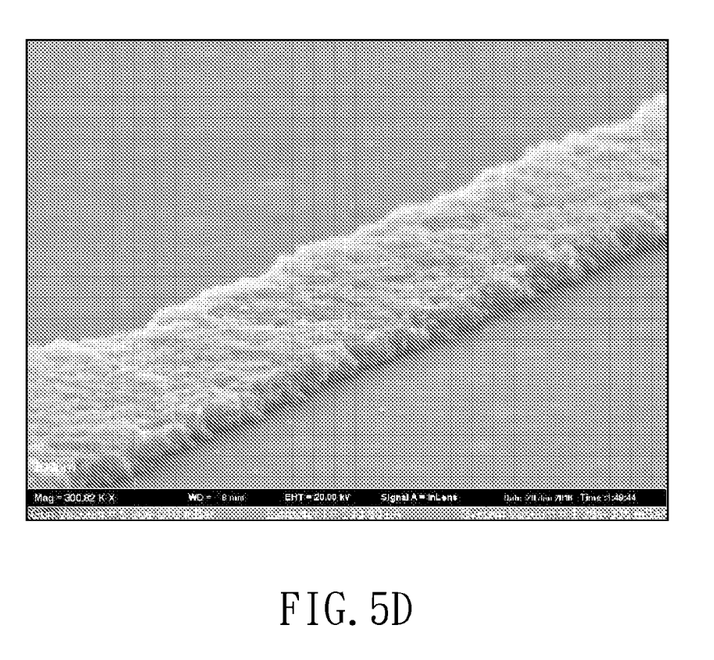

FIG. 5A to FIG. 5D show the SEM micrographs of a patterned gold nanoparticle film produced by the above-mentioned lithography and lifted-off method, where the magnification of FIG. 5A is 63.46K, FIG. 5B 110.49K, FIG. 5C 242.65K, and FIG. 5D 300.82K.

Moreover, according to the present invention, the number of the monolayer not only can be increased but also can be decreased layer-by-layer. In order to strip the top monolayer of nanoparticles of a multilayered nanoparticle film, it would require that the exposed functional group of nanoparticles of the top monolayer to be converted to a solvent-philic group, and immersing the substrate into the solvent (such as toluene), and then the top monolayer of nanoparticles can be stripped from the nanoparticle film and the substrate. The exposed functional group may be converted by plasma modification and/or self-assembled technology described in U.S. patent application Ser. No. 12/502,226, as mentioned before. For example, if the exposed functional group is a hydroxyl group, the methyl group may be connected a Octadecyl-TrichloroSilane (OTS) by self-assembly technique and then the exposed functional group is turned to a methyl group.

Although the preferable embodiment employ gold or silver nanoparticles, in other embodiments of the present invention the nanoparticles may comprise metal, magnetic, semiconductor, polymer nanoparticles, or a combination consisting of two or more of the above-mentioned nanoparticles. In addition, nanoparticles of different monolayer may be the same or different kinds of nanoparticles and may comprise various shapes, such as sphere, nanorod, nanoshell, nanocage, nanostar, bipyramid, octahedral, and so on. For example, a first monolayer is composed of gold nanoparticles, and a second monolayer deposited on the first monolayer is composed of silver nanoparticles. In addition, the nanoparticles may comprise a core of a first material coated with a second material, and the first material may be non-metallic while the second material may be metallic. In addition, the nanoparticles may be purchased from commercial products or synthesized.

Figure 6:
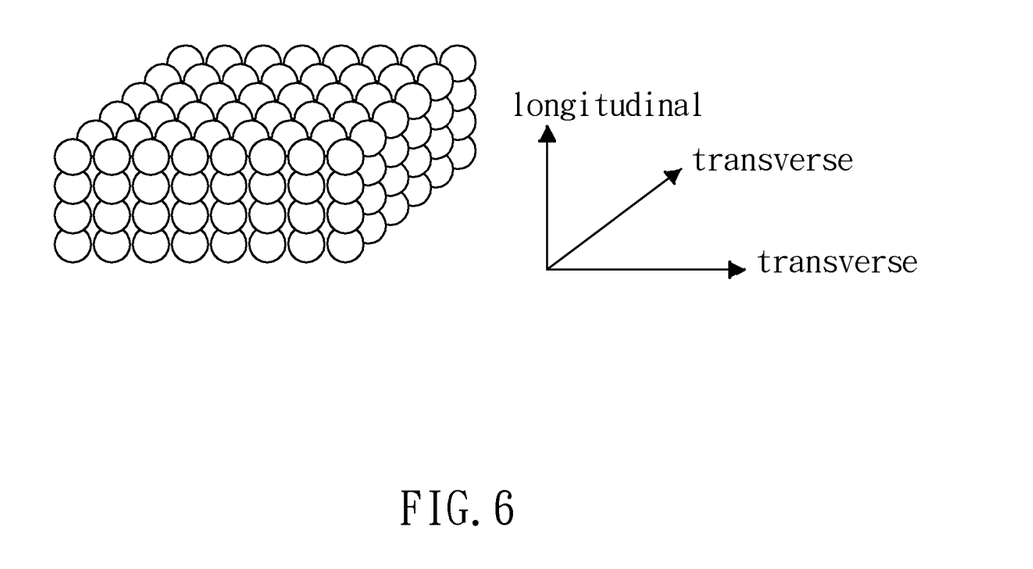
FIG. 6 illustrates a large-scale three-dimensional nanoparticle films in which the nanoparticles are near-field coupled with each other in both the longitudinal and transverse directions.

According to the method above, a three-dimensional, large scale, multilayered nanoparticle film can be produced. Particularly, one important feature of the present invention is that nanoparticles in a same monolayer (intra-monolayer) are near-field coupled with each other, and that nanoparticles between two next monolayer (inter-monolayer) are also near-field coupled with each other. FIG. 6 illustrates a large-scale 3D nanoparticle film in which the nanoparticles are near-field one another in both the transverse direction and the longitudinal direction.

The nanoparticle films produced by the method of the present invention may have various applications. For example, the nanoparticle films of the present invention may be used as components of optoelectronic devices or electronic devices, such as solar cells, light emitting diodes, photo diodes, a thin-film transistors, photo detectors, and so on.

Figure 7:
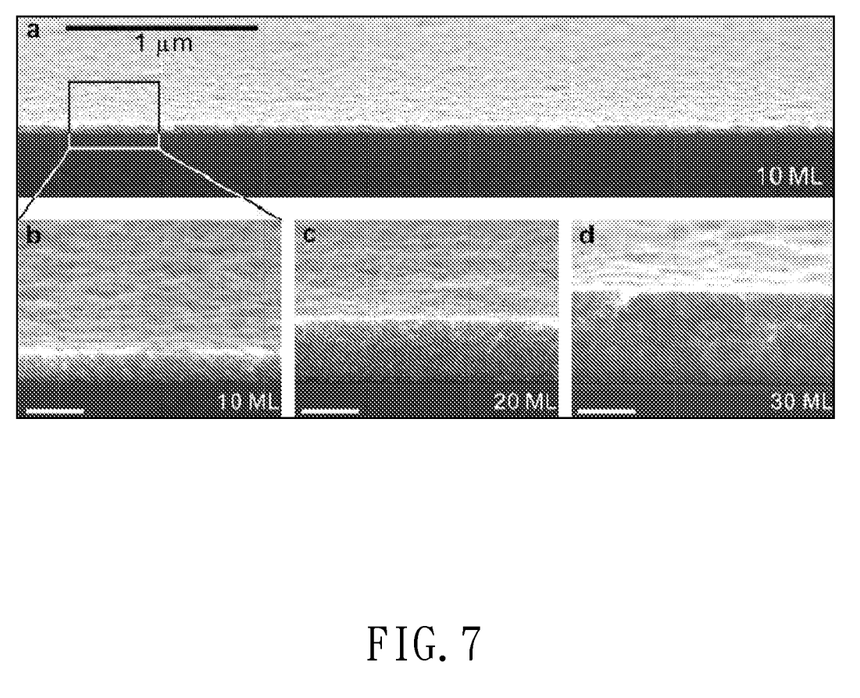
FIG. 7 shows FE-SEM micrographs of gold nanoparticle films with various numbers of monolayer.

In addition, the nanoparticle film of the present invention may be employed as a component of a spectroscopy device to identify a substance. For example, FIG. 7 shows that a gold nanoparticle film deposited on a silicon substrate. The gold nanoparticles (AuNP) will exhibit the collective plasmonic properties of the closed-packed Au nanoparticle film in the visible light region. The optical reflectance and transmittance spectra (not show) of nanoparticle film of FIG. 7 have proved that the CPR band, resulting from intralayer plasmonic coupling (i.e., transverse mode, T-mode), is at about 568 nm. This results in the greenish yellow color in the reflection photograph. Also, this spectral response explains the origin of purple color shown in the transmission photograph. Since the plasmon band is at a longer wavelength (compared to that of dispersed AuNPs in toluene), the AuNP film transmits more blue and less red light, and the transmission of similar amount of red and blue light causes the observation of purple color.

Detailed spectroscopic measurements (not show) of nanoparticle film of FIG. 7 show that there are additional plasmon bands (longitudinal modes, L-modes) in the near-infrared region, originating from the effects of interlayer plasmonic coupling. In contrast to the constant T-mode resonance, the reflectance resonant peaks due to the L-modes critically depend on the number of nanoparticle layers in the films. For the case of AgNP films, the T-mode resonance is at around 468 nm (blue) and the combination of T-mode and layer-by-layer-varied L-mode reflection peaks render the appearance of spectacular rainbow colored films in the full visible range.

FIGS. 7a and 7b show FE-SEM micrographs obtained from the cleaved face of a 10-ML AuNP film grown on the silicon substrate. The high-resolution micrograph shown in FIG. 7b clearly indicates that deposited AuNPs are close packed in the growth direction. As demonstrated in FIGS. 7c and 7d, this technique can be applied to deposit nanoparticle films for up to 30 ML in thickness. Because of the close-packed structure, both transverse and longitudinal near-field plasmonic coupling effects are very strong, allowing the unique opportunity to measure the CPR properties of 3D plasmonic crystal properties in these films, especially those originated from the interlayer coupling.

Figure 8:
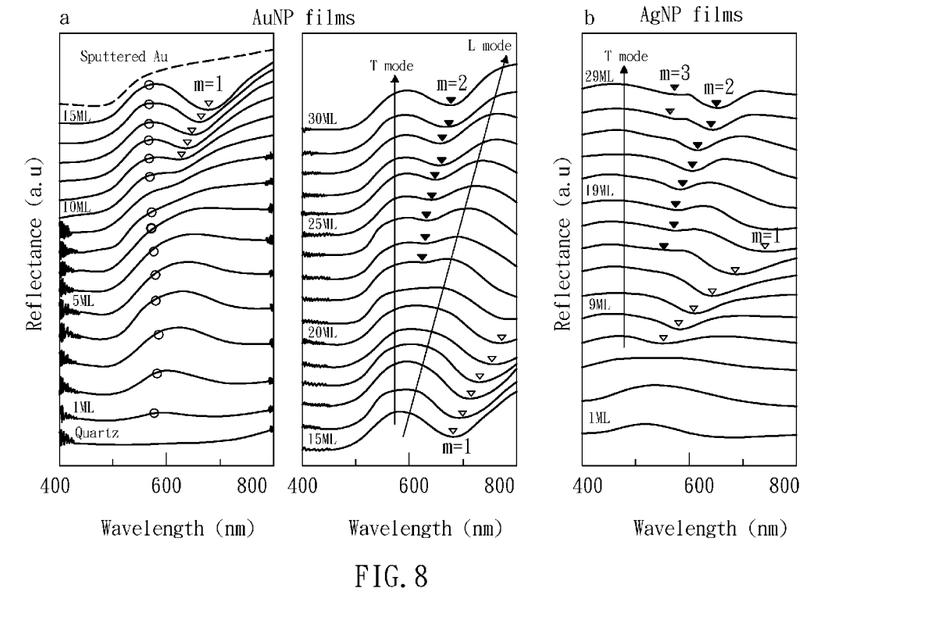
FIGS. 8 and 9 show the excellent plasmonic properties of the nanoparticle films produced by the embodiments of the present invention.
Figure 9:
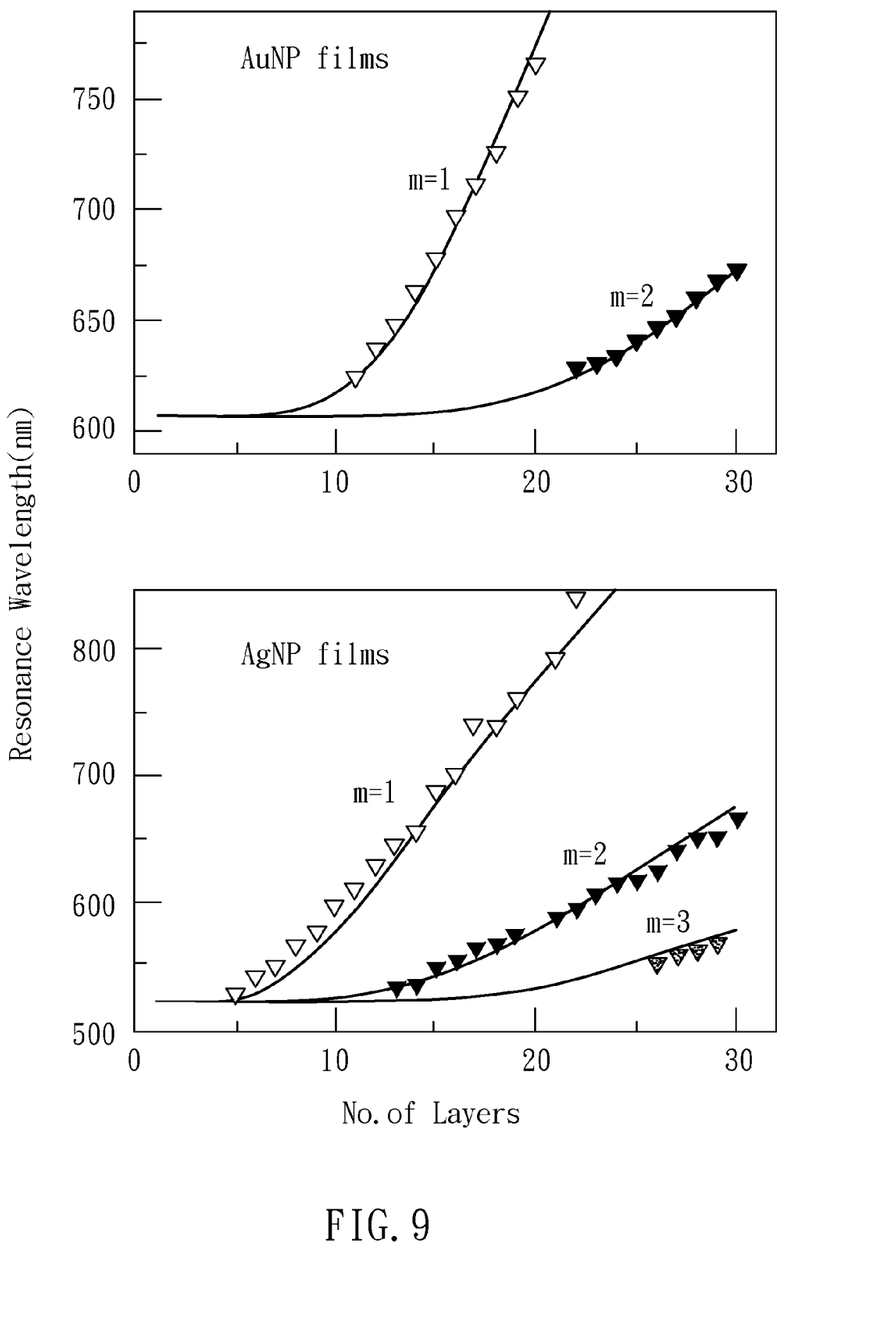

Here, the present invention overcomes the problems by creating monolayers of Janus nanoparticles, which makes the use of cross-linkers unnecessary. The 3D CPR characteristics can be clearly observed in the layer-by-layer-measured reflectance and absorbance (transmittance) spectra (FIG. 8a, 8b and FIG. 9). In FIG. 8a, the reflectance spectra show the presence of CPR peak at the T-mode spectral region of AuNP films. At lower layer numbers, both substrate and semi-transparency effects are significant and the reflectance peak positions do not exactly match with those of absorbance spectra (circles). As the layer number is increased to large than 10 ML, the reflectance peak stabilizes at a fixed spectral position (568 nm) and matches well with the T-mode position in the corresponding absorbance spectra, in agreement with the expected "bulk"-like behavior in this thickness regime. Moreover, clear reflectance dips (marked by order number m=1) starts to appear, which are very different from that measured from a sputtered gold film with a flat, featureless response (a reference spectrum is also shown in FIG. 8a). These reflectance dips (m=1) shift continuously to longer wavelengths with increasing layer number and become out of the spectroscopic detection range after the layer number is larger than 20. In the subsequent spectra, it becomes clear that these reflectance dips indicate the onset of L-modes, which originate from the interlayer CPR and shift into the near-infrared region of the spectrum with increasing layer number. For the case of AgNP films (FIG. 8b) with the T-mode reflectance peak at 468 nm, the L-mode reflectance peaks are in the visible and the AgNP films dramatically change the reflection color even with an addition of single monolayer. In FIG. 8, we can also clearly identify the higher order L-modes (m=2 and m=3 reflectance dips), which split off from m=3 reflectance dips), which split off from the T-mode peak and move gradually into the long wavelength region. Considering the high opacity of nanoparticle films with large numbers of layers, the observation of intense L-modes and their dependence on the layer number ("bulk" properties) in the reflectance spectra indicates the importance of interlayer plasmonic coupling. In FIG. 9, we show that for both AuNP and AgNP films, any lowest order (m=1) resonant dips for the N-layer films can repeatedly appear when the layer number is mN for the higher order (m≠1) reflectance dips.

Accordingly, the nanoparticle film of the present invention has tunable plasmonic properties, and the tunable plasmonic properties may be determined by the number of monolayers of the nanoparticle film, the size and material of the nanoparticles, and the gap between the nanoparticles.

Although only gold and silver nanoparticles are demonstrated here as building blocks for rationally designed plasmonic metamaterials, the present invention could be extended to other nanomaterials and combinations of nanomaterials, as well as deposition on the curved surfaces. Such extensions would allow us to create a variety of nanomaterial-based artificial structures, similar to those achieved by semiconductor growth technology. In particular, the demonstration of strong interlayer plasmonic coupling and the possibility to deposit nanoparticle films with a large number of layers open a new route for designer plasmonic metamaterials.

Although specific embodiments have been illustrated and described, it will be appreciated by those skilled in the art that various modifications may be made without departing from the scope of the present invention, which is intended to be limited solely by the appended claims.

What is claimed is:

1. A method for forming a nanoparticle film, comprising the steps of:
   preparing a nanoparticle solution, which comprises a solvent and supersaturated nanoparticles with surface ligand molecules;
   dip coating a substrate to the nanoparticle solutions to form a first monolayer of the nanoparticles on the substrate, the first monolayer of the nanoparticles constructing the nanoparticle film and each nanoparticle of the first monolayer comprising a hidden side toward the direction of the substrate and the exposed side toward the direction opposite to the substrate;
   converting the exposed surface ligand molecules of the exposed side of the nanoparticles into functional groups phobic to the solvent by plasma modification; and
   dip coating the substrate into another nanoparticle solution comprising the solvent and supersaturated nanoparticles to form one or more monolayers of nanoparticles on the first monolayer.

2. The method as recited in claim 1, wherein the plasma modification is performed through a mask.

3. The method as recited in claim 1, wherein the nanoparticle film comprises two monolayers that have different nanoparticles.

4. The method as recited in claim 1, wherein any two of the monolayers have the same nanoparticles.

5. The method as recited in claim 1, wherein the nanoparticle film comprising one or more monolayers of nanoparticles is formed on a top surface of a patterned resist layer on the substrate and a surface of the substrate that is unoccupied by the patterned resist layer, and then the patterned resist layer is lifted off from the substrate, forming a patterned nanoparticle film.

6. The method as recited in claim 1, wherein the exposed functional group of the exposed side of the top monolayer is converted to a functional group that is phile to the solvent, and then the substrate is immersed in a solvent to remove the top monolayer from the nanoparticle film, wherein the exposed functional group conversion is achieved by the plasma modification or a self-assembly technology.

7. The method as recited in claim 1, wherein the plasma modification is performed through a mask.

8. The method as recited in claim 1, wherein the nanoparticles in a same monolayer (intra-monolayer) are near-field coupled with each other.

9. The method as recited in claim 1, wherein nanoparticles between two next monolayers (inter-monolayer) are near-field coupled with each other.

10. The method as recited in claim 1, wherein the nanoparticles are made of a metal or a core coated with a metal.

11. The method as recited in claim 10, wherein the metal comprises gold, silver, copper, iron, platinum, palladium, aluminum, titanium, vanadium, chromium, nickel, tantalum, tungsten, tin, gallium, cobalt, or combinations thereof.

12. The method as recited in claim 1, wherein the nanoparticles comprise gold or silver nanoparticles, the surface ligand molecules comprise alkanethiols.

13. The method as recited in claim 1, wherein the substrate comprises quartz, indium tin oxide (ITO), silicon, polymer, ceramic, or metal.

14. The method as recited in claim 1, wherein the nanoparticle film has tunable plasmonic properties.

15. The method as recited in claim 14, wherein the tunable plasmonic properties are determined by the number of monolayers of the nanoparticle film, the size of the nanoparticles, and the gap between nanoparticles.

\* \* \* \* \*